(12) United States Patent
Pozgay et al.

(10) Patent No.: US 6,835,030 B2
(45) Date of Patent: Dec. 28, 2004

(54) POWER TOOL ACCESSORY SYSTEM

(75) Inventors: David Pozgay, Chicago, IL (US); Jonathan Riley, Chicago, IL (US); Stephen J. Gaynes, Wonderlake, IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/161,898

(22) Filed: Jun. 4, 2002

(65) Prior Publication Data

US 2003/0223836 A1 Dec. 4, 2003

(51) Int. Cl.⁷ .............................................. B23C 1/20
(52) U.S. Cl. ................... 408/182; 409/178; 144/136.95
(58) Field of Search ............................... 409/182, 178, 409/137, 218, 175, 180, 181; 144/136.95, 154.5; 408/241 G; 451/359, 358; 30/296.1, 276

(56) References Cited

U.S. PATENT DOCUMENTS

| | | | | |
|---|---|---|---|---|
| 4,685,496 A | * | 8/1987 | Livick | 144/154.5 |
| 4,750,536 A | * | 6/1988 | Grisley | 144/251.3 |
| 4,821,365 A | * | 4/1989 | Charters | 144/252.1 |
| 4,989,323 A | * | 2/1991 | Casper et al. | 408/241 R |
| 5,013,196 A | * | 5/1991 | Friegang | 409/182 |
| 5,146,965 A | * | 9/1992 | Gibson | 144/372 |
| D364,790 S | * | 12/1995 | Duennes | D8/61 |
| 5,509,454 A | * | 4/1996 | Giacometti | 144/252 |
| 5,584,620 A | * | 12/1996 | Blickhan et al. | 409/137 |
| 5,662,440 A | * | 9/1997 | Kikuchi et al. | 409/182 |
| 5,688,082 A | * | 11/1997 | Richardson | 408/67 |
| 5,778,949 A | * | 7/1998 | Draves | 144/48.6 |
| 5,813,805 A | * | 9/1998 | Kopras | 408/241 |
| 5,829,931 A | * | 11/1998 | Doumani | 409/132 |
| 5,833,409 A | * | 11/1998 | Giacometti et al. | 409/182 |
| 5,853,036 A | * | 12/1998 | Welch | 144/154.5 |
| 5,993,124 A | * | 11/1999 | Cooper et al. | 409/137 |
| 6,039,038 A | | 3/2000 | Buck et al. | |
| D439,122 S | * | 3/2001 | Adler et al. | D8/61 |
| 6,443,675 B1 | * | 9/2002 | Kopras et al. | 409/182 |
| 6,447,221 B1 | * | 9/2002 | Chen | 408/113 |
| 2002/0187014 A1 | * | 12/2002 | Bergner et al. | 409/182 |

FOREIGN PATENT DOCUMENTS

| | | | | |
|---|---|---|---|---|
| DE | WO 02/26439 A1 | * | 4/2002 | B23Q/9/00 |
| GB | 2299285 | | 10/1996 | |
| WO | 88/00870 | | 2/1988 | |

OTHER PUBLICATIONS

"#960–01 Advantage Circle Cutter Attachment" Dremel Co. advertisment for a Circle Cutter Dremel Tool attachment, believed published circa 2000 on the World Wide Wide at: http:www.dremel.com/productsdisplay/att_template.asp?SKU=960–01&Color=99CCFF.*

"#9000–04 Advantage Rotary Saw Kitt" Dremel Co. advertisement for a Dremel Tool with Depth Guide, believed published circa 2000 on the World Wide Web at: http:www.dremel.com/productsdisplay/att_template2.asp?SKU=9000–04&Color=99CCFF.*

"Rotozip Dust Extractor Attachment," Sears advertisement for a Rotozip Dust Extractor Attachment for Rotozip Spiral Saw tools, believed published circa 2001 on the World Wide Web at: http://www.sears.com/sr/product/summary/summary.jsp?BV_SessionID=@@@@@07.*

* cited by examiner

Primary Examiner—A. L. Wellington
Assistant Examiner—Dana Ross
(74) Attorney, Agent, or Firm—Greer, Burns & Crain, Ltd.

(57) ABSTRACT

A power tool accessory system has a first accessory with a first connector for attaching the accessory to the power tool, and a second connector for attaching a second accessory to the first accessory. Preferably both attachment means are manually operable whereby the first accessory may be attached to a power tool and to a second accessory without the use of tools.

18 Claims, 5 Drawing Sheets

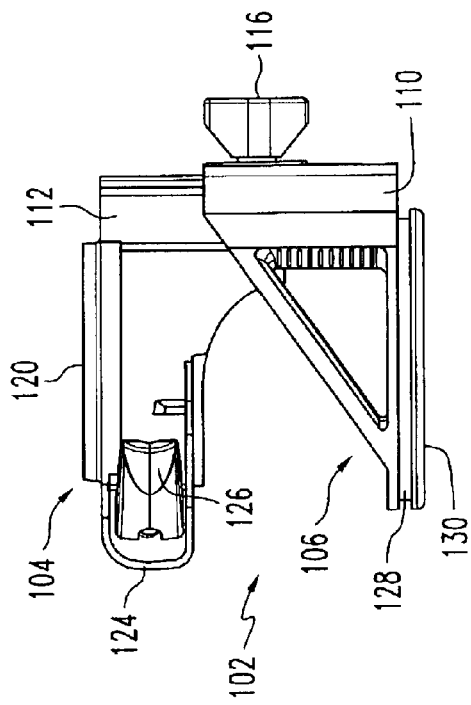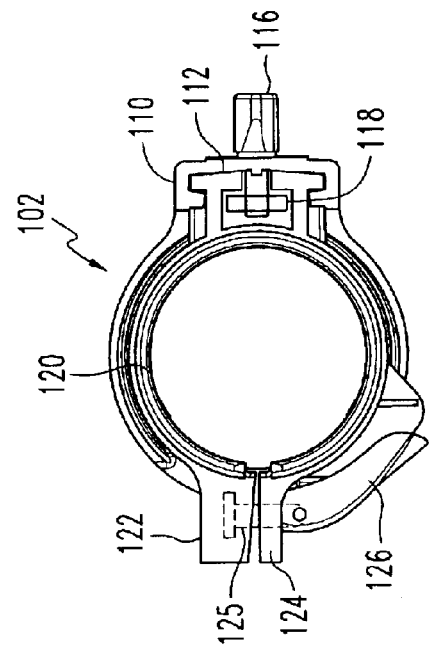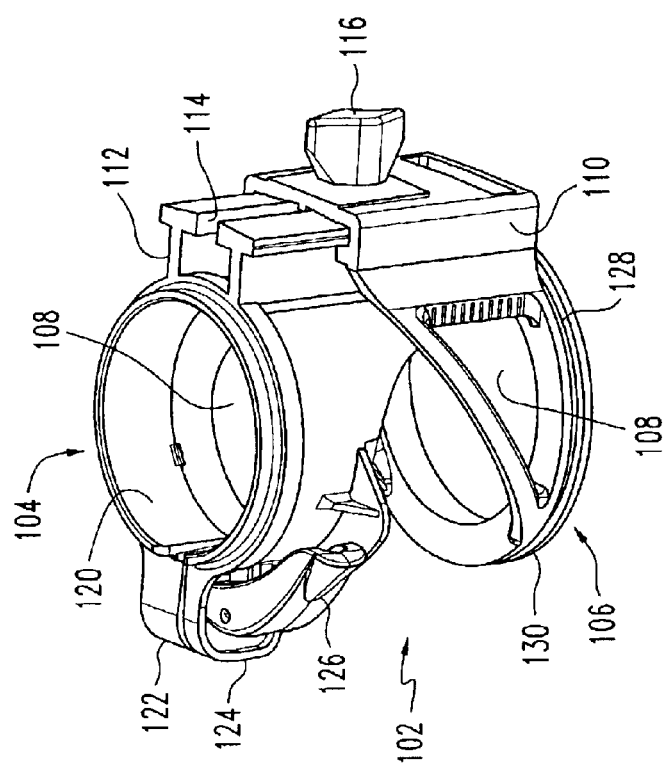

POWER TOOL ACCESSORY SYSTEM

FIELD OF THE INVENTION

The present invention is related to power tools. More particularly, the present invention is related to power tool accessories such as attachments for power hand tools.

BACKGROUND OF THE INVENTION

Power hand tools such as drills, rotary cutting tools, and the like are known in the art. These tools are widely used by tradesmen, hobbyists, and others in a wide variety of applications. Use in some of these applications may be aided by an attachment to the power tool. For example, a depth adjuster accessory may be used with a rotary cutting tool to cut an opening in a surface to a limited depth. A depth adjuster may be used when penetrating a drywall surface, for instance, so the wall is only penetrated to a limited depth to avoid interfering with objects behind the drywall. By way of additional example, other power tool attachments include a vacuum adaptor, a template guide, and a circle cutter.

Examples of such accessories as are known in the art have problems associated with them. One problem, for example, is that attachment and removal of the accessory from the power tool often requires tools such as a wrench or screwdriver. This can be disadvantageous in that time, effort, and cost are associated with obtaining, carrying, and using the wrench or screwdriver. Another example of a problem with some known accessories is that they do not allow for attachment of a second accessory. That is, some accessories do not provide for use in combination—once a first accessory is attached to the power tool no additional accessories can be attached.

SUMMARY OF THE INVENTION

A power tool accessory system comprises a first accessory for connection to the power tool and for attaching a second accessory to the first. The first accessory has a first connector proximate a top perimeter for connecting the accessory to the power tool, and a second connector proximate to a generally circular bottom perimeter of the accessory for attaching a second accessory to the first. Preferably, both the first and second connectors are manually operable so that attachments may be made without the use of tools.

BRIEF DESCRIPTION OF THE FIGURES

FIG. 1 is a perspective of a preferred depth adjuster embodiment of the invention;

FIG. 2 is a side elevational view of the depth adjuster of FIG. 1;

FIG. 3 is top view of the depth adjuster of FIG. 1;

DETAILED DESCRIPTION

Figure 5:
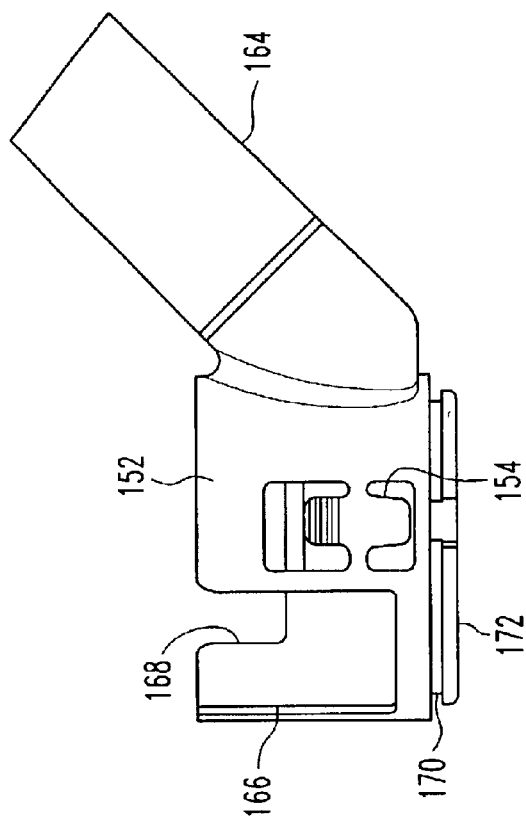
FIG. 5 is a side elevational view of the vacuum adaptor of FIG. 4.

An embodiment of the present invention is directed to a power hand tool accessory system. In a first invention embodiment, an accessory system is provided having a first accessory with a first connector for connecting to the power tool and a second connector for attaching a second accessory to the first. In other invention embodiments, an accessory system of the invention may comprise additional accessories. For example, an additional invention embodiment comprises a first accessory attached to a second accessory, with the second accessory having attachment means for attaching a third accessory. In this manner, embodiments of the accessory system of the invention provide a modular system that advantageously provides for the convenient and interchangeable attachment of one or many accessories to a power tool. In considering the example embodiments of the invention to be discussed below, it will be appreciated that different invention embodiments may comprise different numbers of accessories and different particular accessories.

FIGS. 1–3 show various views of an example embodiment of the invention that comprises a single accessory for attachment to a power tool. In particular, a preferred first accessory of the invention comprises a depth adjuster indicated generally at 102 for attachment to a power rotary tool. The depth adjuster 102 has an upper member indicated generally at 104 and a lower member indicated generally at 106 that are movably connected to one another. Both the members 104–106 have a central passage 108 for passing a rotary cutting tool bit. A substantially vertical sleeve 110 on the lower member 106 movably engages a rail 112 on the upper member 104, with the rail 112 having a lengthwise slot 114. A locking bolt 116 is received in the sleeve 110, and engages a nut 118 held below the rail slot 114 for locking the rail 112 in place in the sleeve 110, with the result that upper member 104 may be selectively locked in position relative to the lower member 106. Other connectors for movably attaching the upper and lower members 104 and 106 will be apparent to those knowledgeable in the art.

The depth adjuster upper member 104 has a first connector for attaching to the power tool. In particular, an expandable locking collar 120 defines the top rim of the upper member 104. The locking collar 120 has an expanded open position with a first diameter, and a smaller closed position of a smaller diameter. As best illustrated by FIG. 3, a pair of cooperating locking shoulders 122 and 124 are on the perimeter of the collar 120, with a locking pin 125 (shown in dashed) movably passing through the shoulders 122 and 124. The pin 125 cooperates with a locking lever 126 to lock the collar 120.

In particular, operation of the lever 126 can adjust the distance between the shoulders 122 and 124, and thereby the diameter of the locking collar 120. When the locking lever 126 is in a locked position, the shoulders 122 and 124 are urged towards one another until they are substantially adjacent. The locking collar 120 is thus in a closed position.

When the locking lever 126 is disengaged, the shoulders 122 and 124 may be moved away from one another, wherein the locking collar 120 is in an open position with a larger diameter than its closed position. To attach the depth adjuster 102 to the substantially circular abutment of a power tool, the collar 120 in an open position is moved into position about the abutment. The locking lever 126 is locked to urge the collar 120 toward a smaller diameter closed position to securely engage the abutment.

Those knowledgeable in the art will appreciate that the depth adjuster of the invention may comprise an alternative connector to the locking collar 16. By way of example, a male or female connector could be provided for mating with a cooperating connector on the tool. Preferably, the first connector will comprise a manually operable connector that does not require the use of a tool such as a wrench or pliers. Manual operation is desirable for convenience.

The depth adjuster 102 further comprises a channel connector 128 on its lower member 106 for attaching an accessory. The channel 128 passes around the perimeter of a bottom rim 130 to form a female connector for receiving a male connector, such as a locking stud or the like. Those knowledgeable in the art will appreciate that other invention embodiments may have an alternate second connector. By way of example, the bottom perimeter of the lower member 106 need not be circular, and the channel 128 need not pass along all of the bottom rim 130 perimeter, but could instead pass along only a portion thereof. Additionally, a male connector such as a ridge or the like could replace the female channel, as well as other types of connectors.

Figure 4:
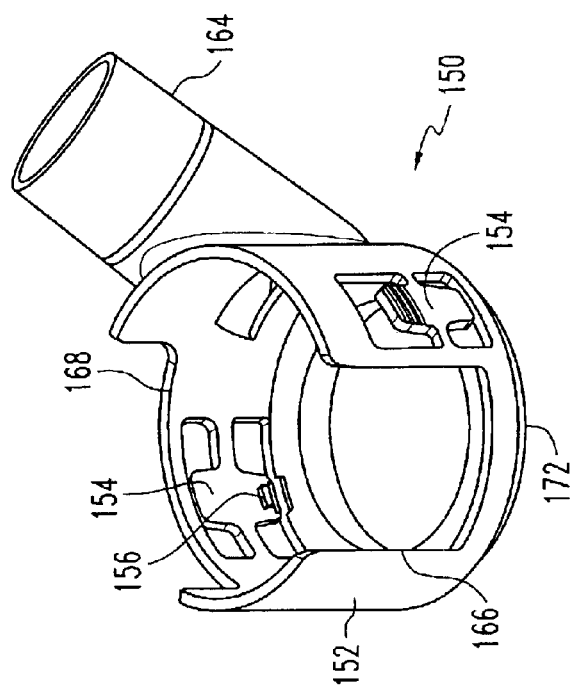
FIG. 4 is a perspective view of a vacuum adaptor embodiment of the invention.
Figure 7:
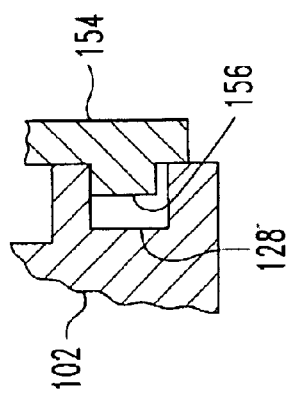
FIG. 7 is a partial cross section of FIG. 6.
Figure 6:
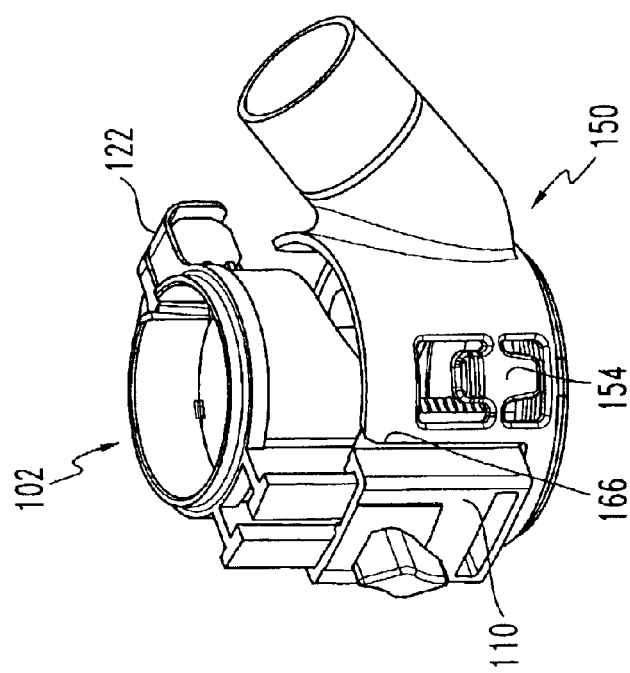
FIG. 6 is a perspective view of the depth adjuster of FIG. 1 attached to the vacuum adaptor of FIG. 4.

Another example embodiment of the tool accessory system of the invention further comprises a second accessory having a primary connector for attaching to the second connector of the first accessory. FIGS. 4 and 5 illustrate a preferred second accessory that comprises a vacuum adaptor indicated generally at 150. The vacuum adaptor 150 has a substantially circular body 152 for receiving the depth adjuster 102 therein. The vacuum adaptor 150 has a connector in the form of a plurality of integral spring levers 154 for engaging the female channel connector 128 of the depth adjuster 102. As best illustrated by FIGS. 6 and 7, when the depth adjuster 102 is placed in the vacuum adaptor body 152, the two integral spring levers 154 engage the depth adjuster channel 128 with male studs 156 that are on an interior side of the levers 154 near their bottom ends 160. The partial cross section of FIG. 7 illustrates this engagement in greater detail. To remove the depth adjuster from the vacuum adaptor, the spring lever top end 158 may be urged inward with the result that the male stud 156 will disengage from the depth adjuster attachment channel 128.

Figure 8:
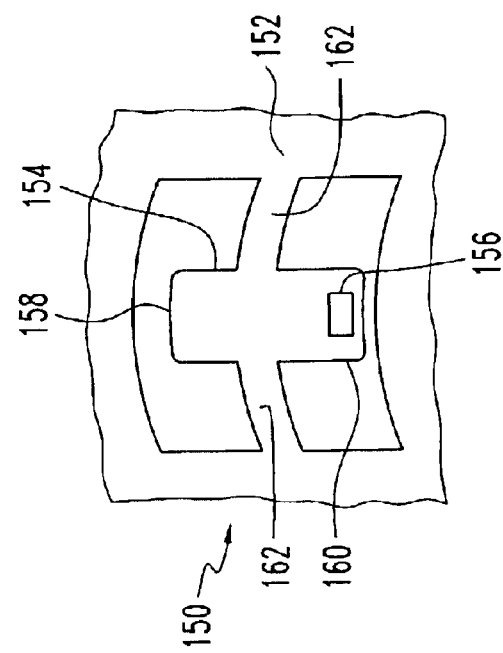
FIG. 8 is an expanded view of a portion of the vacuum adaptor of FIG. 4.

Referring now to FIGS. 4, 5 and 8, the spring levers 154 are preferably integral with the vacuum adaptor body 152. Most preferably, the body 152 and levers 154 are made of a molded plastic. As best shown by FIG. 8, the levers 154 are formed integrally with the body 152 through a cross member 162 near their centers. This may be accomplished by providing a cutout portion of the vacuum adaptor body 152 that defines the lever 154 and the cross member 162. Forming the spring levers 154 in this manner is advantageous for considerations of cost of manufacture. The cross member 162 provides a spring force that can be used for connecting to the depth adjuster channel 128. Varying the length and width of the cross member 61 will vary the magnitude of the spring force.

The preferred vacuum adaptor 150 also has a vacuum port 164 for connection to a vacuum source such as a shop vac. The port 164 may be, for instance, a ¼" cylindrical tube consistent with standard ¼ vacuum hoses. The vacuum port 164 communicates with the central passage 108 of the depth adjuster 102 when the adjuster 102 is attached to the vacuum adaptor 150. The preferred vacuum adaptor 150 also has a slot 166 for receiving the sleeve 110 of the depth adjuster 102, as well as a cutout 168 for receiving the shoulders 122, 124 and the locking lever 126.

The vacuum adaptor 150 also has a connector channel 170 for attaching a third accessory to the vacuum adaptor. The channel 170 extends around a bottom rim 172 of the vacuum adaptor 150. As shown by FIG. 6, when the depth adjuster 102 is attached to the vacuum adaptor 150, the vacuum adaptor attachment channel 170 remains unobstructed for attachment to a third accessory. Preferably, the channel 170 is substantially identical in size to the depth adjuster connector channel 128 in that they have a cross direction width, a depth, and a diameter that are substantially equal. This is advantageous in that a uniform connectors on both the accessories allows for interchangeability for an accessory system—a third accessory having a connector for engaging the uniform connector channel may be attached to either of the depth adjuster or the vacuum adaptor.

Figure 10:
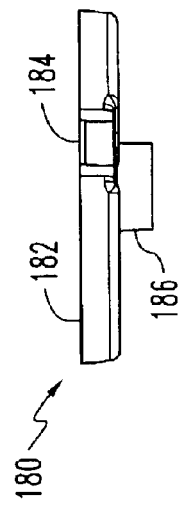
FIG. 10 is a side elevational view of the template adaptor of FIG. 9.
Figure 13:
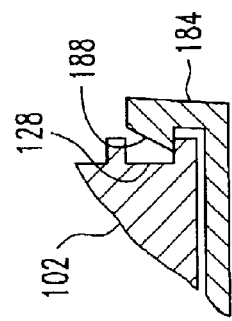
FIG. 13 is a partial cross section of FIG. 12 showing in greater detail the attachment of the template adaptor to the depth adjustor.
Figure 12:
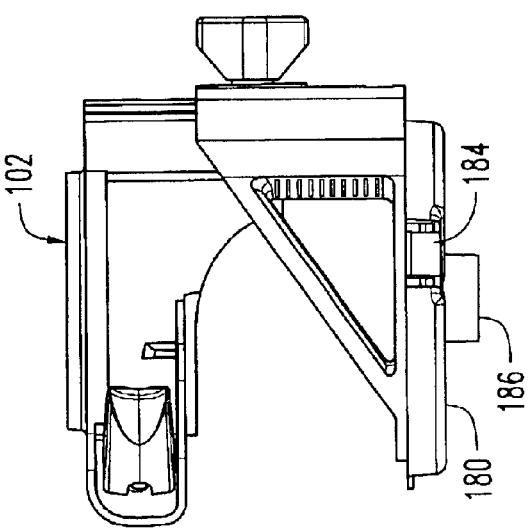
FIG. 12 is a side elevational view showing the template adaptor of FIG. 9 attached to the depth adjustor of FIG. 1.
Figure 9:
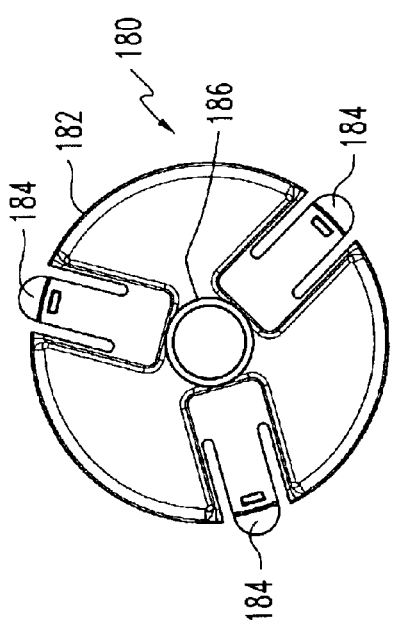
FIG. 9 is a bottom plan view of a template adaptor embodiment of the invention.
Figure 11:
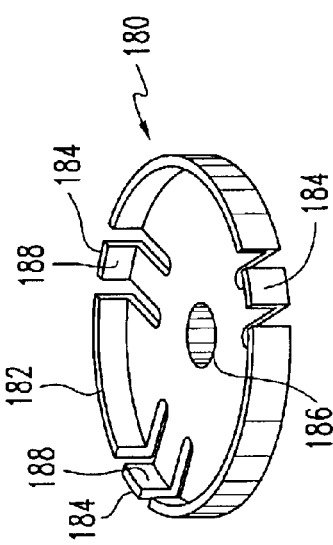
FIG. 11 is a perspective view of the template adaptor of FIG. 9.

Indeed, other embodiments of the invention may comprise more than two accessories. FIGS. 9–11, for example, show various views of a third accessory in the form of a template adaptor indicated generally at 180 that may be a part of an additional invention embodiment. The template adaptor 180 generally has a substantially saucer shaped body 182 with a connector in the form of a plurality of spring levers 184 for engaging the attachment channel 128 of the depth adjuster 102 or the attachment channel 170 of the vacuum adaptor 150 for attachment thereto. FIG. 12, for example, shows the template adaptor 180 attached to the depth adjuster 102. As shown in greater detail by the partial cross section of FIG. 13, each of the spring levers 184 have a male stud 188 on their ends for engaging the channel 128 of the depth adjuster 102. It will be appreciated that the template adaptor spring levers 184 and male studs 188 may be used in a similar manner to engage the channel 66 of the vacuum adjuster 150. The template adaptor is useful for adapting the cutting tool for use with a template or the like. In particular, a central rim 186 descending from the body 182 for passing the bit of a power tool provides an annular surface useful to engage a template or other device used to cut a pattern.

Figure 14:
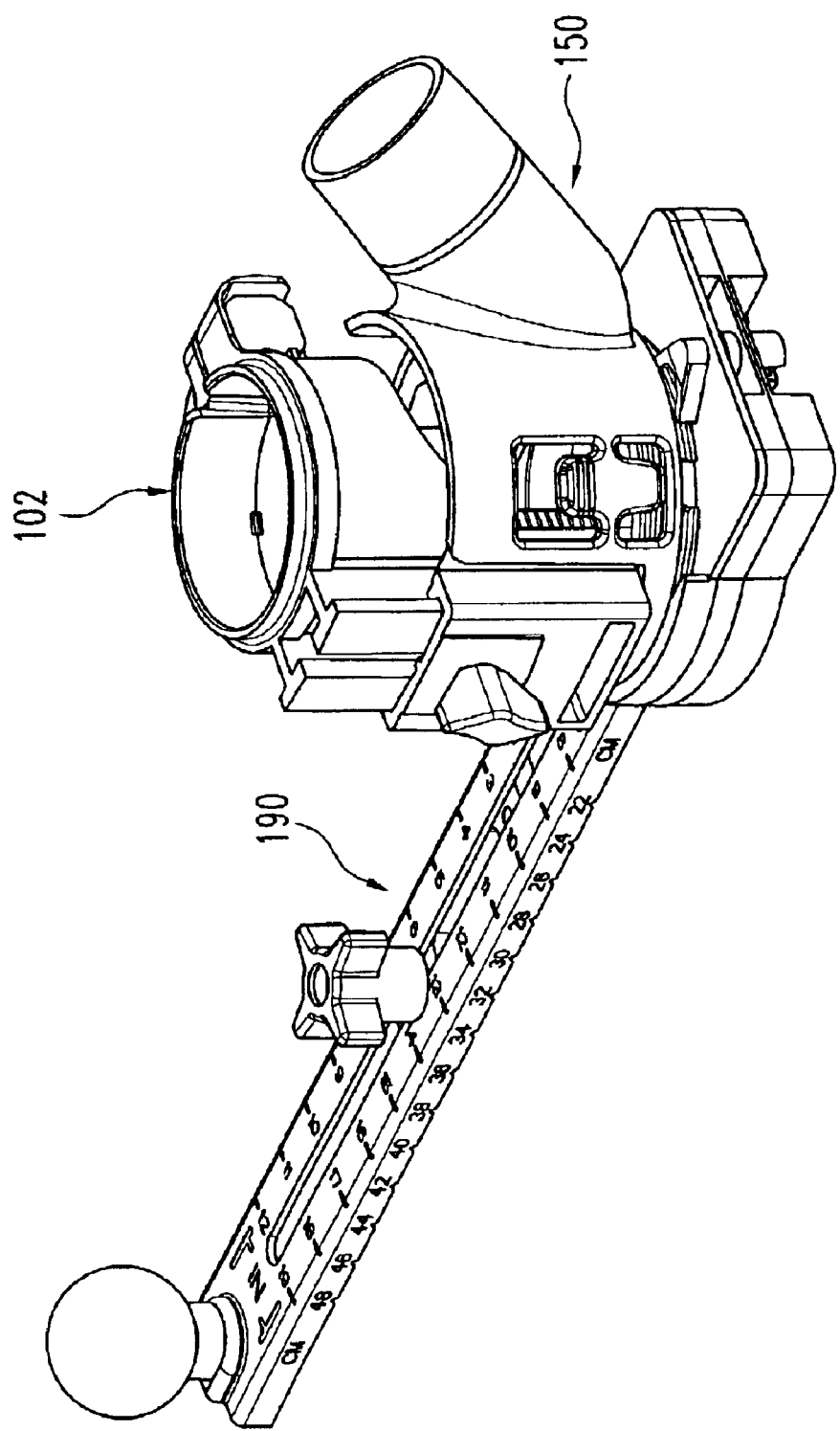
FIG. 14 shows the depth adjustor of FIG. 1 attached to a circle template embodiment of the invention.

FIG. 14 illustrates an additional example of a third accessory for attachment to the depth adjuster 102 and/or the vacuum adaptor 150. In particular, a circle cutter shown generally at 190 has a connector for attaching to the channel 128 of the depth adjuster 102 or the channel 170 of the vacuum adaptor 150. The male connector may comprise, by way of example, one or more movable male studs in a cradle for engaging the channel 128 or 170. As illustrated in FIG. 14, the circle cutter 190 has been attached to the vacuum adaptor 150 that is in turn attached to the depth adjustor 102. In a particular example of a preferred circle cutter 190, the circle cutter has a non-movable male connector for sliding engagement with the channel 128 of the depth adjuster 102 to connect the circle cutter 190 to the depth adjuster 102. The non-moving male connector may be in the shape of a semi circle, for instance, with the depth adjuster 102 slid into engagement with the male connector to prevent upward movement of the connector. Most preferably, a spring clip, lever, or other means may also be provided to prevent the depth adjuster 102 from sliding out of engagement with the semi-circle shaped male connector.

Embodiments of the present invention thereby provide many advantages and solve otherwise unresolved problems of the prior art. For example, an embodiment of the invention comprises a first accessory for connecting to a power tool and having a connector for attaching a second accessory to the first accessory. Attachments may be made in a secure and convenient manner, without requiring the use of tools such as a wrench, pliers, screws, or the like. Further, other invention embodiments comprise a second accessory with a connector for attaching a third accessory to the second. The connectors are preferably substantially identical, so that different combinations of accessories can be used.

Those skilled in the art will appreciate that many variations on the example embodiments that have been shown and discussed herein are possible. For example, although the invention embodiment that comprises a single accessory for attachment to a power tool has been discussed as the preferred depth adjustor 102, it will be understood that other invention embodiments may comprise a single accessory other than a depth adjustor. By way of particular example, the vacuum adaptor 150 taken alone may comprise an embodiment of a single accessory of the invention. Likewise, although example embodiments of third accessories in the form of a template adaptor and a circle cutter have been shown, it will be appreciated that many other examples of third accessories are possible.

Various features of the invention are set forth in the appended claims.

What is claimed is:

1. An accessory system for attachment to a rotary cutting tool, the accessory system comprising:
    a depth adjuster having an upper member and a lower member, one of said upper and lower members having a substantially vertical sleeve and the other having a substantially vertical rail engagable in said sleeve to movably connect said upper and lower members to one another, said rail lockable within said sleeve;
    said upper member having a locking collar for engaging the rotary cutting tool, said locking collar having a closed position, an open position, and manual locking means for urging said collar towards said closed position from said open position to engage the cutting tool;
    said lower member having a generally circular bottom rim with a generally circular outer perimeter, and having a channel extending around substantially all of said generally circular outer perimeter; and
    a second accessory removably engaged with said lower member channel.

2. A power tool accessory system as defined by claim 1 wherein said second accessory has a plurality of male connectors removably engaged in said channel.

3. A power tool accessory system comprising:
    a first accessory having generally circular top and bottom perimeters, said first accessory having a collar proximate said top perimeter for removably connecting said first accessory to the power tool, said collar having a closed and an open position and locking means for urging said collar towards said closed position, said first accessory having a channel along at least a portion of said circular perimeter for removably attaching said first accessory to a second accessory, and said first accessory comprising an upper member and a lower member, said upper and lower members having cooperating connecting means for movably connecting to one another; and
    a second accessory, said second accessory having at least a connector for releasably engaging said first accessory bottom perimeter channel to attach said second accessory to said first accessory, said second accessory having a lower perimeter, a channel along at least a portion of said lower perimeter for attaching a third accessory to said second accessory, said second accessory lower perimeter channel having a cross direction width substantially the same as the cross direction width of first accessory bottom perimeter channel.

4. A power tool accessory system as defined by claim 3 wherein said second accessory has a body for receiving at least a portion of said first accessory, said body having a cutout for receiving said first accessory collar, said body having a slot for receiving said cooperating connecting means of said first accessory upper and lower members.

5. A power tool accessory system comprising:
    a first accessory having generally circular top and bottom perimeters, said first accessory having a first connector for removably connecting said first accessory to the power tool, said first connector proximate said top perimeter, and said first accessory having a second connector for removably attaching said first accessory to a second accessory, said second connector extending around substantially all of said generally circular bottom perimeter;
    a second accessory comprising a primary connector for engaging said first accessory second connector to removably attach said second accessory to said first accessory, and a channel for removably attaching said second accessory to a third accessory, said channel substantially the same size as said first accessory second connector; and,
    a third accessory, said third accessory having at least one spring lever having a stud for engaging either one of said second accessory channel or said first accessory second connector.

6. A rotary tool accessory system for a rotary tool that has a cutting bit and a circular abutment, the accessory system comprising:
    a depth adjuster for adjusting the cutting depth of the rotary cutting tool, said depth adjuster having an upper and a lower member movably connected to one another, said depth adjuster having generally circular top and bottom perimeters, said depth adjuster having a locking collar proximate the top of said upper member for engaging the rotary tool circular abutment, said depth adjuster having a central opening for passing at least a portion of the cutting bit, said central opening passing through both of said top and bottom perimeters, and said depth adjuster having a channel along at least a portion of said lower perimeter of said lower member for removably attaching said depth adjuster to a second accessory; and
    a second accessory, said second accessory comprising a vacuum adaptor having a port for communicating with a vacuum, said vacuum accessory having at least a spring lever for engaging said depth adjuster channel, and said vacuum adaptor having a secondary connector for removably attaching a third accessory to said vacuum adaptor.

7. A power tool accessory system as defined by claim 6 wherein said depth adjuster being at least partially inserted into said vacuum adaptor when said at least a spring lever engages said depth adjuster channel, and wherein said vacuum adaptor secondary connector comprises a channel along at least a portion of a vacuum adaptor bottom rim, said vacuum adaptor channel substantially the same size as said depth adjuster channel.

8. An accessory system for attachment to a rotary cutting tool, the accessory system comprising:

a depth adjuster having an upper member and a lower member, one of said upper and lower members having a substantially vertical sleeve and the other having a substantially vertical rail engagable in said sleeve to movably connect said upper and lower members to one another, said rail lockable within said sleeve, said upper member having a locking collar for engaging the rotary cutting tool, said locking collar having a closed position, an open position, and manual locking means for urging said collar towards said closed position from said open position to engage the cutting tool, said lower member having a generally circular bottom rim and having a channel extending around substantially all of said generally circular bottom rim for attaching a second accessory; and, a vacuum adaptor having a vacuum port for connection to a vacuum source, said vacuum adaptor having a plurality of integral spring lever connectors for engaging said depth adjuster channel; said vacuum adaptor having a generally circular bottom rim with a channel connector for attaching a third accessory to said vacuum adaptor, said vacuum adaptor channel connector having substantially the same diameter, channel width, and channel depth as said depth adjuster channel.

9. A power tool accessory system comprising:

a depth adjuster having top and bottom perimeters vertically moveable relative to one another, a first connector proximate said top perimeter for attaching to the power tool, and a second connector proximate said bottom perimeter;

second and third accessories, each of said second and third accessories having a primary connector for attaching to said depth adjuster second connector whereby either one of said second or third accessories may be attached to said depth adjuster.

10. A power tool accessory system as defined by claim 9 wherein said second and third accessories each comprise one of a vacuum adaptor, a circle cutter, or a template adaptor.

11. A power tool accessory system comprising:

a first accessory having generally circular top and bottom perimeters, having a first connector proximate said top perimeter for removably connecting said first accessory to the power tool, having a channel extending around substantially all of said generally circular bottom perimeter for removably attaching said first accessory to a second accessory; and, a second accessory having a body and a plurality of spring levers integral with said body, each of said spring levers comprising a lever with two ends, said lever integrally connected to said body by a cross member, said plurality of spring levers for cooperating with said channel to removably attach said second accessory to said first accessory.

12. A power tool accessory system as defined by claim 11 wherein said second accessory body is comprised of a molded polymer and wherein said integral spring levers are formed by providing a cutout portion of said molded polymer body that defines said integral spring levers.

13. A power tool accessory system comprising:

a depth adjuster having generally circular top and bottom perimeters, having a first connector proximate said top perimeter for removably connecting said depth adjuster to the power tool, having a second connector extending around substantially all of said generally circular bottom perimeter for removably attaching said depth adjuster to a second accessory;

a vacuum adaptor having a port for connection to a vacuum source and comprising a primary connector for engaging said depth adjuster second connector to removably attach said vacuum adaptor to said depth adjuster, and having a secondary connector for removably attaching said vacuum adaptor to a third accessory, said secondary connector substantially the same size as said depth adjuster second connector; and;

wherein said third accessory has a connector for engaging either one of said vacuum adaptor secondary connector or said depth adjuster second connector, said third accessory comprising one of a circle cutter or a template adaptor.

14. An accessory system for attachment to a power cutting tool having a bit, the accessory system comprising:

a depth adjuster having an upper member and a lower member, one of said upper and lower members having a sleeve and the other having a rail engagable in said sleeve to movably connect said upper and lower members to one another, said rail lockable within said sleeve;

a locking collar on said upper member for engaging the power cutting tool;

a central passage defined by said upper and lower members for passing the power cutting tool bit; and a generally circular bottom rim on said depth adjuster lower member, a channel running in a circumferential direction along at least a portion of said generally circular rim and configured to receive at least one male connector from a second accessory.

15. An accessory system for attachment to a power cutting tool as defined by claim 14 and further including said second accessory connected to said lower member, said second accessory having at least one of said male connectors engaged with said channel.

16. An accessory system for attachment to a power cutting tool as defined by claim 15 wherein said second accessory comprises one of a vacuum adaptor, a template adaptor, or a circle cutter.

17. An accessory system for attachment to a power cutting tool as defined by claim 14 wherein said bottom rim has a generally circular exterior perimeter, and wherein said channel is along at least a portion of said generally circular exterior perimeter.

18. An accessory system for attachment to a power cutting tool as defined by claim 17 wherein said channel is along substantially all of said generally circular exterior perimeter.

* * * * *